(12) United States Patent
Kataoka et al.

(10) Patent No.: US 10,825,191 B2
(45) Date of Patent: Nov. 3, 2020

(54) NON-TRANSITORY COMPUTER READABLE RECORDING MEDIUM, ASSESSMENT METHOD, AND ASSESSMENT DEVICE

(71) Applicant: FUJITSU LIMITED, Kawasaki (JP)

(72) Inventors: Masahiro Kataoka, Kamakura (JP); Junya Kato, Ota (JP); Takuya Kozaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 16/273,788

(22) Filed: Feb. 12, 2019

(65) Prior Publication Data

US 2019/0287260 A1    Sep. 19, 2019

(30) Foreign Application Priority Data

Mar. 13, 2018    (JP) .................................. 2018-046001

(51) Int. Cl.
*G06K 9/00*     (2006.01)
*G06T 7/593*    (2017.01)
*G06T 7/246*    (2017.01)

(52) U.S. Cl.
CPC .............. *G06T 7/593* (2017.01); *G06T 7/246* (2017.01); *G06T 2207/30241* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 6,114,951 A * | 9/2000 | Kinoshita | B60Q 9/008 340/435 |
| 7,046,822 B1 * | 5/2006 | Knoeppel | B60W 30/16 382/103 |
| 8,027,029 B2 * | 9/2011 | Lu | G01S 17/931 356/4.01 |
| 9,939,813 B2 * | 4/2018 | Shashua | G05D 1/0287 |
| 10,332,292 B1 * | 6/2019 | Arnicar | B60W 60/00272 |
| 2005/0063565 A1 * | 3/2005 | Nagaoka | B60R 21/013 382/104 |
| 2005/0100192 A1 * | 5/2005 | Fujimura | G06K 9/00805 382/103 |
| 2007/0127778 A1 * | 6/2007 | Fujimoto | G06T 7/246 382/104 |

(Continued)

FOREIGN PATENT DOCUMENTS

JP    2011-511281 A    4/2011
JP    2012-198857 A    10/2012

*Primary Examiner* — Shervin K Nakhjavan
(74) *Attorney, Agent, or Firm* — Westerman, Hattori, Daniels & Adrian, LLP

(57) ABSTRACT

An assessment device generates, based on a captured image captured by an image capturing device mounted on a moving object, shape information on subjects included in the captured image. The assessment device acquires, by referring to a storage, shape information on a static object associated with the image capturing location. The assessment device specifies, based on the generated shape information and the acquired shape information, a dynamic object that is moving from among the subjects included in the captured image and conducts an assessment related to the dynamic object based on the location in the captured image.

6 Claims, 6 Drawing Sheets

(56) References Cited

U.S. PATENT DOCUMENTS

| | | | |
|---|---|---|---|
| 2008/0036576 A1* | 2/2008 | Stein | G08G 1/167 340/425.5 |
| 2009/0228204 A1 | 9/2009 | Zavoli et al. | |
| 2010/0253543 A1* | 10/2010 | Szczerba | G06K 9/00805 340/932.2 |
| 2011/0019873 A1* | 1/2011 | Yamato | G08G 1/165 382/103 |
| 2014/0063232 A1* | 3/2014 | Fairfield | B60T 7/18 348/118 |
| 2016/0061172 A1* | 3/2016 | Sato | B60W 30/16 701/112 |
| 2017/0330463 A1* | 11/2017 | Li | B60K 37/04 |
| 2018/0005407 A1* | 1/2018 | Browning | B60W 30/095 |
| 2018/0188037 A1* | 7/2018 | Wheeler | B60W 40/02 |
| 2018/0239968 A1* | 8/2018 | Gupta | G06K 9/00637 |
| 2018/0293893 A1* | 10/2018 | Yang | B60W 30/0956 |
| 2018/0336424 A1* | 11/2018 | Jang | G05D 1/0238 |

\* cited by examiner

| TIME | IMAGE CAPTURING LOCATION | CAPTURED IMAGE DATA |
|---|---|---|
| TIME t1 | COORDINATES (x1, y1) | CAPTURED IMAGE DATA CAPTURED AT TIME t1 |
| TIME t2 | COORDINATES (x2, y2) | CAPTURED IMAGE DATA CAPTURED AT TIME t2 |
| TIME t3 | COORDINATES (x3, y3) | CAPTURED IMAGE DATA CAPTURED AT TIME t3 |
| ... | ... | ... |

| TIME | MOVING SPEED (MOVEMENT VECTOR) |
|---|---|
| TIME t1 | MOVING SPEED OF MOVING OBJECT AT TIME t1 |
| TIME t2 | MOVING SPEED OF MOVING OBJECT AT TIME t2 |
| TIME t3 | MOVING SPEED OF MOVING OBJECT AT TIME t3 |
| ... | ... |

FIG.6
| IMAGE CAPTURING LOCATION | SHAPE OF STATIC OBJECT | LOCATION OF STATIC OBJECT |
|---|---|---|
| COORDINATES (X1, Y1) | SHAPE OF EACH STATIC OBJECT AT TIME t1 | LOCATION OF EACH STATIC OBJECT AT TIME t1 |
| COORDINATES (X2, Y2) | SHAPE OF EACH STATIC OBJECT AT TIME t2 | LOCATION OF EACH STATIC OBJECT AT TIME t2 |
| COORDINATES (X3, Y3) | SHAPE OF EACH STATIC OBJECT AT TIME t3 | LOCATION OF EACH STATIC OBJECT AT TIME t3 |
| ... | ... | ... |
140c
FIG.7
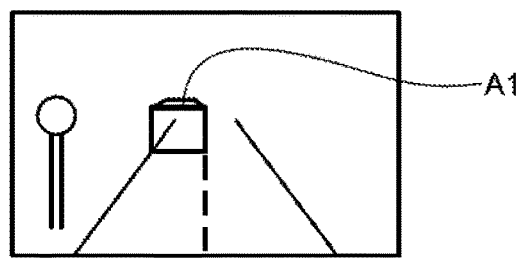
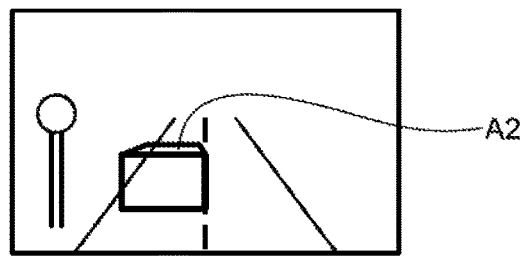
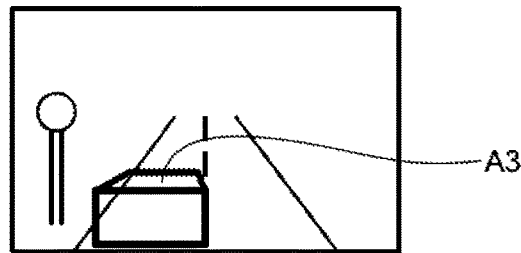

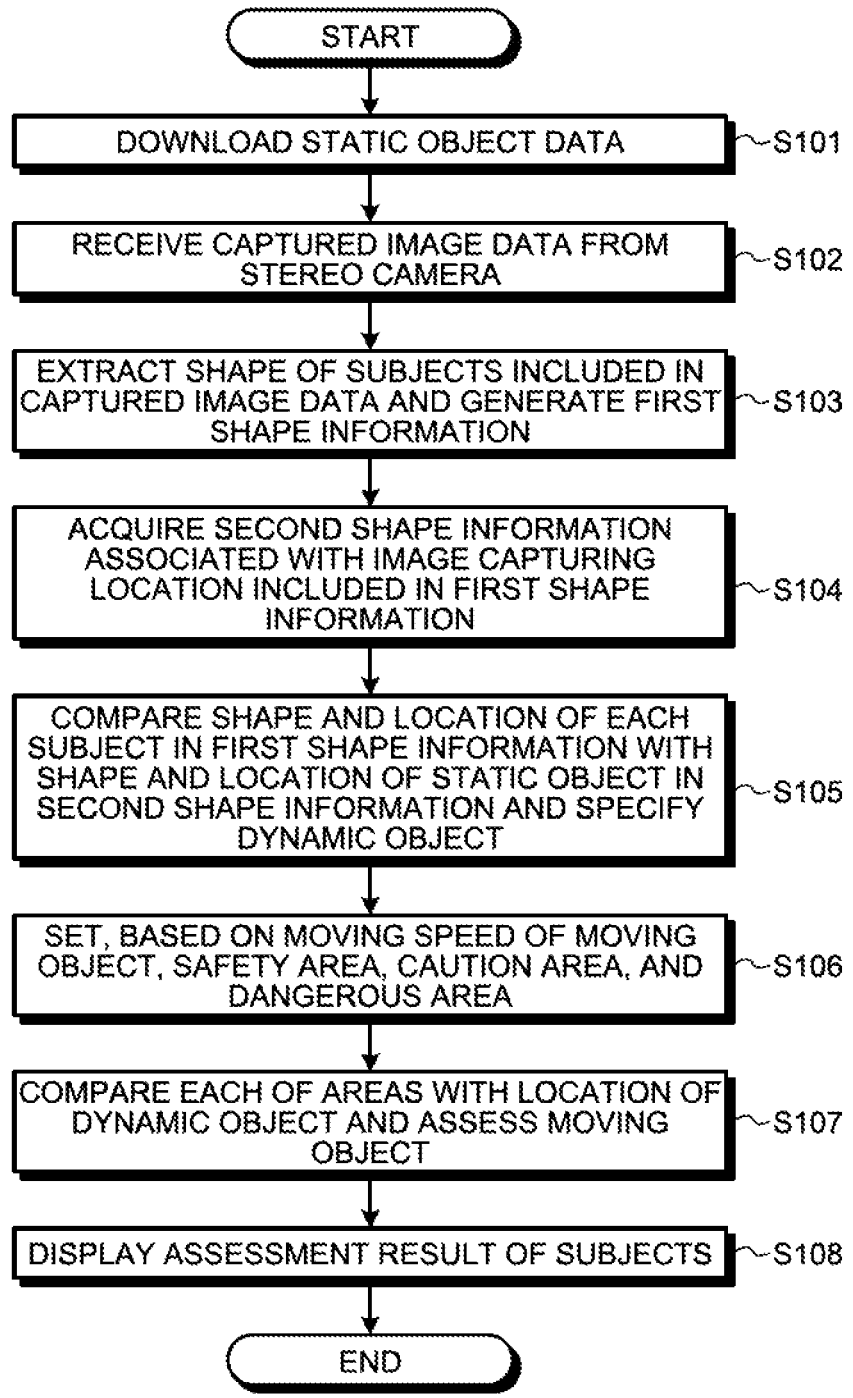

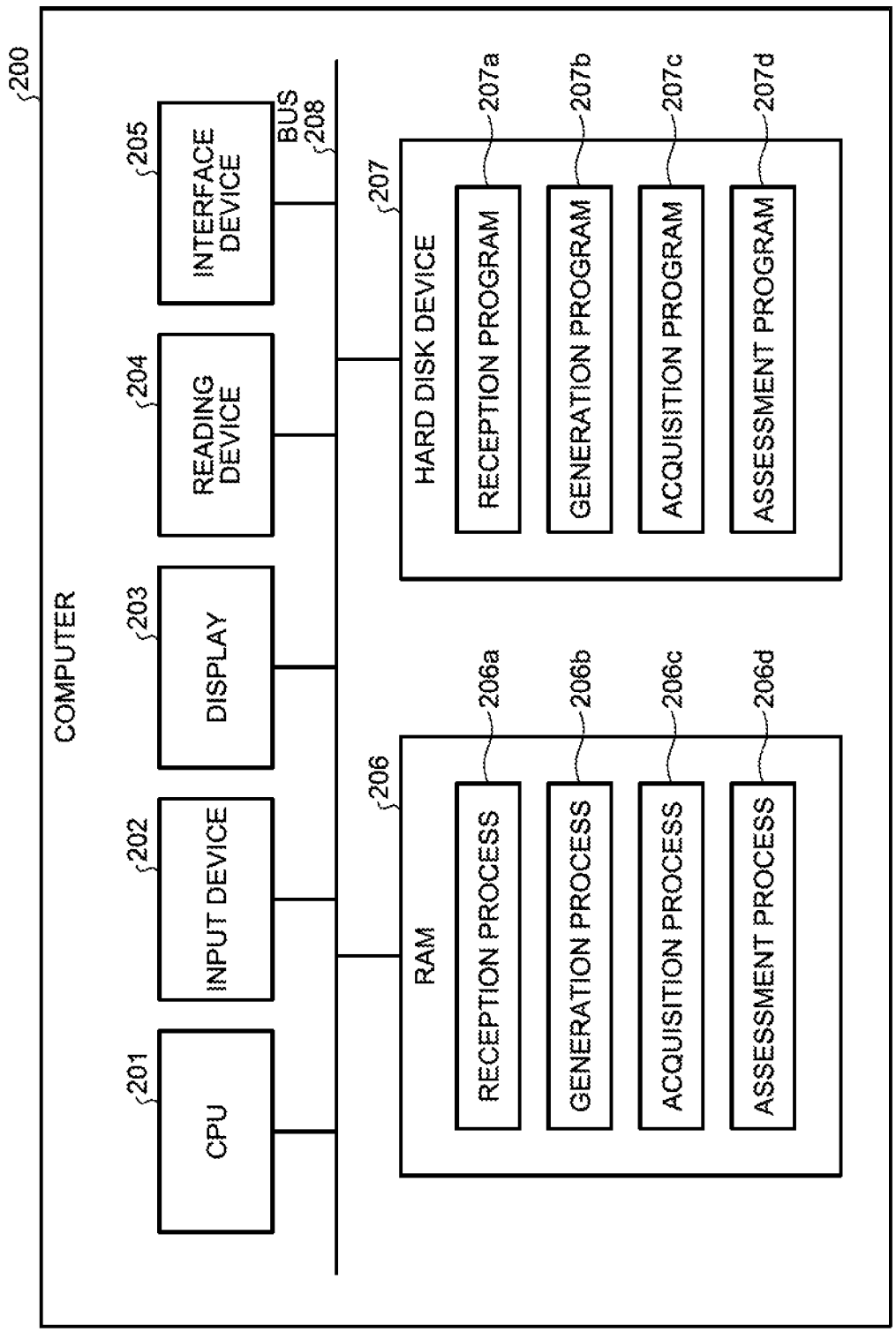

# NON-TRANSITORY COMPUTER READABLE RECORDING MEDIUM, ASSESSMENT METHOD, AND ASSESSMENT DEVICE

CROSS-REFERENCE TO RELATED APPLICATION

This application is based upon and claims the benefit of priority of the prior Japanese Patent Application No. 2018-046001, filed on Mar. 13, 2018, the entire contents of which are incorporated herein by reference.

FIELD

The embodiment discussed herein is related to a computer-readable recording medium, and the like.

BACKGROUND

Compressing video images captured by video cameras at high compression rate by using a compression technology, such as Moving Picture Experts Group (MPEG), is mainly used for video image compression. Furthermore, in recent years, attempts have been made to apply a technology that is used to analyze video images captured by a car-mounted camera and compressed using MPEG and recognize both static objects, such as roads and signs, included in the video images and dynamic objects, such as the other cars, bikes, or peoples, to an automatic operation of vehicles.

Patent Document 1: Japanese Laid-open Patent Publication No. 2012-198857

Patent Document 2: Japanese National Publication of International Patent Application No. 2011-511281

SUMMARY

According to an aspect of an embodiment, a non-transitory computer readable recording medium has stored therein an assessment program that causes a computer to execute a process including receiving a captured image captured by an image capturing device mounted on a moving object and an image capturing location of the captured image; generating, based on the received captured image, shape information on subjects included in the captured image; acquiring shape information on a static object associated with the received image capturing location from a storage that stores therein shape information on the static object included in the captured image corresponding to the image capturing location of the captured image; specifying, based on the generated shape information and the acquired shape information, a dynamic object that is moving from among the subjects included in the received captured image; and conducting an assessment related to the dynamic object based on the location of the specified dynamic object in the received captured image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data structure of a buffer according to the embodiment;

FIG. 5 is a diagram illustrating an example of a data structure of a moving speed table according to the embodiment;

FIG. 6 is a diagram illustrating an example of a data structure of static object data according to the embodiment;

FIG. 7 is a diagram illustrating an example of each of areas that are set in an assessment unit;

FIG. 8 is a flowchart illustrating the flow of a process performed by the assessment device according to the embodiment; and FIG. 9 is a diagram illustrating an example of a hardware configuration of a computer that implements the same function as that performed by the assessment device.

DESCRIPTION OF EMBODIMENT

However, with the conventional technology described above, there is a problem in that it is not possible to distinguish static objects from dynamic objects and improve each of the pieces of assessment accuracy of the objects.

For example, in a video image captured by a car-mounted camera, because a vehicle moves, not only dynamic objects but also static objects also move. Consequently, in compression performed by using MPEG, encoding is not performed in units of objects and it is thus difficult to distinguish the static objects from the dynamic objects at the time of detection; therefore, it is difficult to improve the assessment accuracy of the objects.

Preferred embodiments of the present invention will be explained with reference to accompanying drawings. Furthermore, the present invention is not limited to the embodiments.

Figure 1:
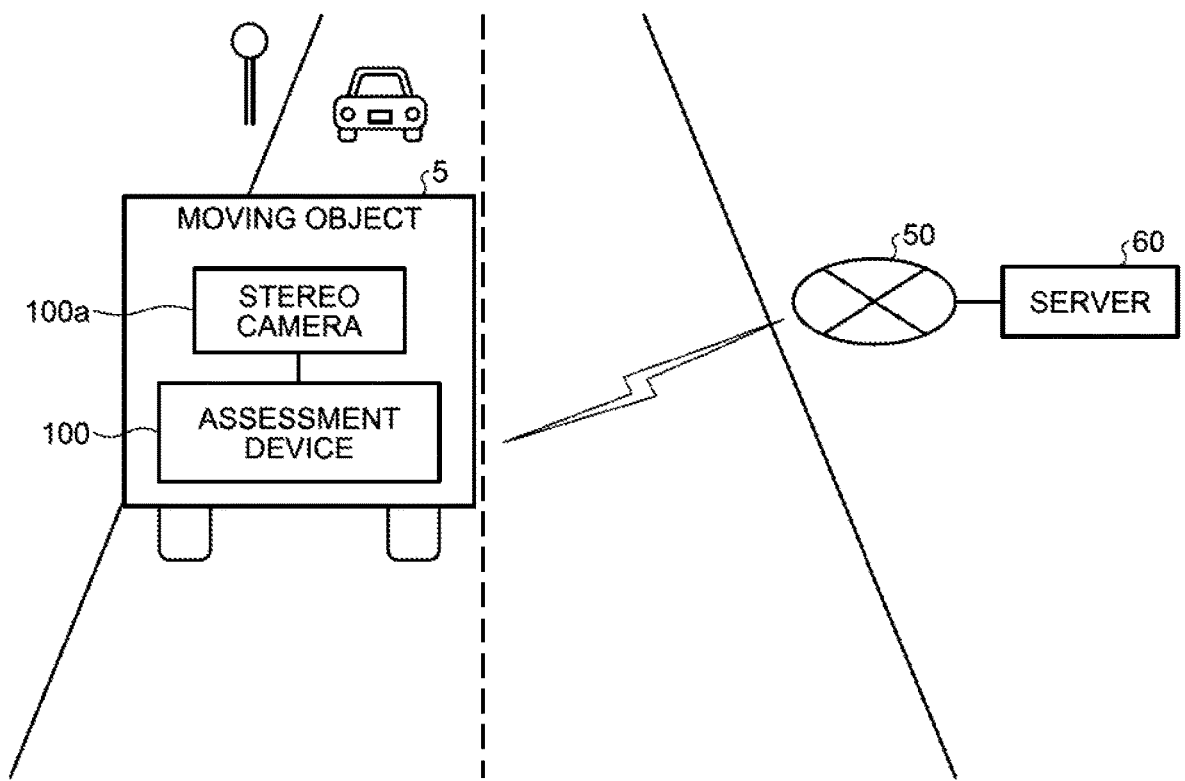
FIG. 1 is a diagram illustrating an example of a system according to an embodiment.

FIG. 1 is a diagram illustrating an example of a system according to an embodiment. As illustrated in FIG. 1, in this system, a stereo camera 100a and an assessment device 100 are mounted on a moving object 5. In the embodiment, a description will be given of a case, as an example, in which the moving object 5 is a vehicle running on a road; however, the example is not limited to the vehicle as long as the moving object 5 is a moving item.

The assessment device 100 is connected to the stereo camera 100a. Furthermore, for example, the assessment device 100 is connected to a network 50 by wireless communication and is connected to a server 60 via the network 50.

The server 60 is a server that stores therein "static object data" in which a shape of a static object (stationary item) included in a captured image previously captured by a camera (not illustrated), the location of the shape, and the image capturing location of the captured image are associated with each other. For example, if the server 60 receives a download request from the assessment device 100, the server 60 sends the static object data to the assessment device 100.

The stereo camera 100a is a camera (binocular camera) that simultaneously captures an image of a target objects by two lenses from different directions. The stereo camera 100a can actively use parallax based on binocular lenses and extract the distance from each subject and the shape of each of the subjects.

The assessment device 100 downloads, in advance, the static object data from the server 60. The assessment device 100 extracts, based on the principle of stereo matching, the shape of each of the subjects from the captured image data captured by the stereo camera 100a and compares the extracted shape of each of the subject with the shape of the static object that is associated with the image capturing location of the captured image data. The assessment device 100 determines that a subject matched to the shape of the static object is a static object and specifies a subject that is not matched to the shape of the static object as a dynamic object (moving object). The assessment device 100 conducts an assessment of the subject specified as the dynamic object.

For example, the assessment device 100 sets, based on a moving speed of the moving object 5, a plurality of areas that are in accordance with a possibility that the moving object 5 collides. The assessment device 100 sets a "safety area" in which there is no possibility of a collision, a "caution area" in which there is a low possibility of a collision, and a "dangerous area" in which there is a high possibility of a collision. The assessment device 100 performs a process of assessing whether the subject specified as the dynamic object is included in which area out of the safety area, the caution area, and the dangerous area and performs a process of notifying the moving object 5 of the assessment result.

Figure 2:
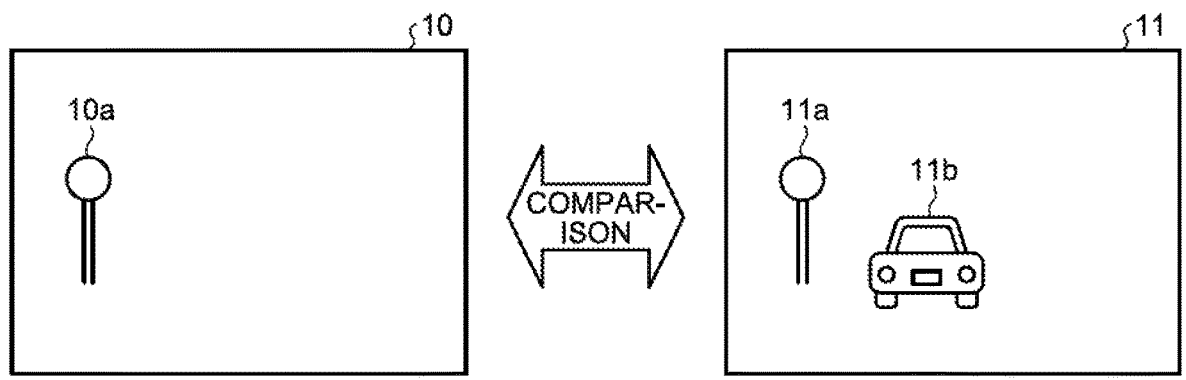
FIG. 2 is a diagram illustrating an example of a process performed by an assessment device according to the embodiment.

FIG. 2 is a diagram illustrating an example of a process performed by the assessment device according to the embodiment. In the example illustrated in FIG. 2, a description will be given of a case in which the assessment device 100 has extracted subjects 11a and 11b from a captured image data 11 captured by the stereo camera 100a. The assessment device 100 acquires, from the static object data downloaded from the server 60, static object shape data 10 that is associated with the image capturing location of the captured image data 11. It is assumed that, in the static object shape data 10, information on the shape of a static object 10a is included.

The assessment device 100 compares the location of the shape of the static object 10a included in the static object shape data 10 with the location of the shape of each of the subjects 11a and 11b included in the captured image data 11 and then specifies a dynamic object. In the example illustrated in FIG. 2, because the location of the shape of the static object 10a is associated with the location of the shape of the subject 11a, the assessment device 100 determines that the subject 11a is a static object. Furthermore, because the static object associated with the location of the shape of the subject 11b is not present in the static object shape data 10, the assessment device 100 determines that the subject 11b is a dynamic object. The assessment device 100 conducts an assessment of the subject 11b that is to be a dynamic object by comparing the location of the shape of the subject 11b with each of the safety area, the caution area, and the dangerous area.

The assessment device 100 according to the embodiment specifies, by comparing the shape of each of the subjects extracted from the captured image data captured by the stereo camera 100a with the shape of the known static object that is associated with the location in which the captured image data has been captured, a moving object from among the subjects and then conducts an assessment. Consequently, the assessment device 100 can appropriately specify a moving object from the captured image data captured by the stereo camera 100a; therefore, it is possible to improve the assessment accuracy related to the moving object.

Figure 3:
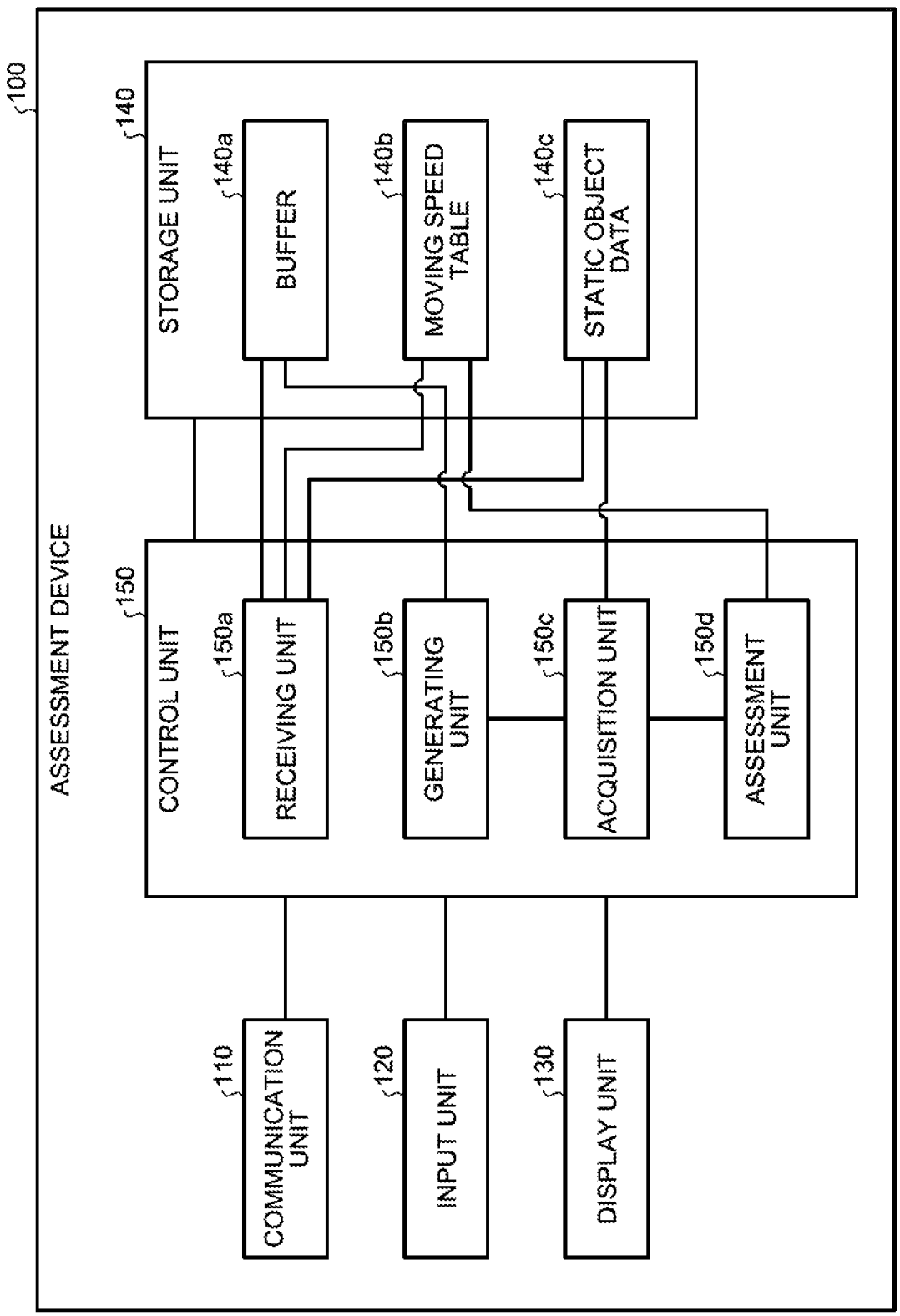
FIG. 3 is a functional block diagram illustrating a configuration of the assessment device according to the embodiment.

In the following, an example of a configuration of the assessment device according to the embodiment will be described. FIG. 3 is a functional block diagram illustrating a configuration of the assessment device according to the embodiment. As illustrated in FIG. 3, the assessment device 100 includes a communication unit 110, an input unit 120, a display unit 130, a storage unit 140, and a control unit 150.

The communication unit 110 is a processing unit that performs data communication between the stereo camera 100a and the server 60. The communication unit 110 acquires the captured image data captured by the stereo camera 100a. For example, it is assumed that, in the captured image data captured by the stereo camera 100a, a combination of an image of captured image data captured from a first direction and an image of captured image data captured from a second direction that is different from the first direction are included.

The communication unit 110 is connected to the server 60 via the network 50 by wireless communication and receives the static object data from the server 60.

Furthermore, the communication unit 110 is connected to a speed measuring device (not illustrated) mounted on the moving object 5. The speed measuring device is a device that measures a moving speed (movement vector) of the moving object 5 based on the speed of the moving object 5 and a rudder angle or the like of the steering wheel of the moving object 5. The communication unit 110 acquires information on the moving speed from the speed measurement device.

The control unit 150, which will be described later, sends and receives data to and from the stereo camera 100a, the server 60, and the speed measuring device via the communication unit 110.

The input unit 120 is an input device that is used to input various kinds of information to the assessment device 100. For example, the input unit 120 corresponds to a keyboard, a mouse, a touch panel, or the like.

The display unit 130 is a display device that displays information output from the control unit 150. For example, the display unit 130 corresponds to a liquid crystal display, a touch panel, or the like.

The storage unit 140 includes a buffer 140a, a moving speed table 140b, and static object data 140c. The storage unit 140 corresponds to a semiconductor memory device, such as a random access memory (RAM), a read only memory (ROM), and a flash memory, or a storage device, such as a hard disk drive (HDD).

The buffer 140a is a buffer that holds captured image data captured by the stereo camera 100a. FIG. 4 is a diagram illustrating an example of a data structure of the buffer according to the embodiment. As illustrated in FIG. 4, the buffer 140a associates the time, the image capturing location, and the captured image data. The time indicates the time at which the stereo camera 100a captured the captured image data. The image capturing location indicates the location (coordinates) in which the captured image data has been captured by the stereo camera 100a. The captured image data is the captured image data captured by the stereo camera 100a.

The moving speed table 140b is a table that holds information on a moving speed (movement vector) of the moving object 5 at each time. FIG. 5 is a diagram illustrating an example of a data structure of the moving speed table according to the embodiment. As illustrated in FIG. 5, the moving speed table 140b associates the time with the moving speed of the moving object 5.

The static object data 140c is information in which the information on the shape of the static object included in the captured image data that has previously been captured by a camera (not illustrated) is associated with the image capturing location of the captured image data. FIG. 6 is a diagram illustrating an example of a data structure of the static object data according to the embodiment. As illustrated in FIG. 6, the static object data 140c associates the image capturing location, the shape of the static object, and the location of the static object. The image capturing location indicates the location (coordinates) in which the captured image data has been captured. The shape of the static object indicates the shape of each of the static objects included in the captured image data. The location of the static object indicates the location of each of the static objects in the captured image data.

The control unit 150 includes a receiving unit 150a, a generating unit 150b, an acquisition unit 150c, and an assessment unit 150d. The control unit 150 can be implemented by a central processing unit (CPU), a micro processing unit (MPU), or the like. Furthermore, the control unit 150 can also be implemented by hard-wired logic, such as an application specific integrated circuit (ASIC) or a field programmable gate array (FPGA).

The receiving unit 150a receives the captured image data from the stereo camera 100a; associates the received captured image data, the time, and the image capturing location; and registers the associated information in the buffer 140a. For example, it is assumed that the time is added to the captured image data. The information on the image capturing location may also be added to the captured image data when the stereo camera 100a captures the captured image data. Alternatively, the receiving unit 150a may also calculate the location in which the captured image data has been captured by using global positioning system (GPS) function at the time of reception of the captured image data.

The receiving unit 150a periodically sends a download request for the static object data to the server 60. When the receiving unit 150a receives the static object data from the server 60, the receiving unit 150a registers the static object data in the storage unit 140 as the static object data 140c. The timing at which the static object data is downloaded may also be sent, as an instruction, to the receiving unit 150a by a user operating the input unit 120.

The receiving unit 150a acquires data on a moving speed from the speed measuring device, associates the time with the moving speed, and registers the associated information in the moving speed table 140b.

The generating unit 150b is a processing unit that generates, based on the captured image data stored in the buffer 140a, the shape information on the plurality of subjects included in the captured image data. Here, as an example, a process of generating the shape information based on the captured image data at the image capturing location (xa, ya) will be described.

The generating unit 150b acquires the captured image data at the image capturing location (xa, ya) stored in the buffer 140a and extracts the shape of the subject from the captured image data. For example, in the captured image data captured by the stereo camera 100a, a set of the captured image data captured from the first direction and the captured image data captured from the second direction is associated. Furthermore, the captured image data may also be one of the pieces of captured image data between the captured image data captured by the stereo camera 100a from the first direction and the captured image data captured by the stereo camera 100a from the second direction.

The generating unit 150b specifies, based on the principle of stereo matching, a distance between a point on the subject included in the captured image data and the stereo camera 100a. For example, the generating unit 150b extracts, as the shape of the subject, the area of a point group in which the distance from the stereo camera 100a is less than a predetermined distance. For example, in the example described with reference to FIG. 2, the generating unit 150b extracts, from the captured image data (the captured image data 11), the shape of the subject 11a and the shape of the subject 11b. The predetermined distance described above is set to be a focal distance of the stereo camera 100a.

The generating unit 150b generates the shape information on the subject by associating the time t, the image capturing location (xa, ya), the extracted shape of the subject, and the location of the shape of the subject. The generating unit 150b outputs the shape information to the acquisition unit 150c. In a description below, the shape information generated by the generating unit 150b is appropriately referred to as "first shape information".

The acquisition unit 150c is a processing unit that acquires, when the first shape information has been acquired, the shape of the static object associated with the image capturing location and the location of the static object that are included in the first shape information. For example, the acquisition unit 150c specifies, from each of the records in the static object data 140c, the record of the image capturing location that is the closest to the image capturing location (xa, ya) included in the first shape information and acquires the shape of the static object and the location of the static object included in the specified record. In a description below, the shape of the static object and the location of the static object acquired by the acquisition unit 150c from the static object data 140c are appropriately referred to as "second shape information".

The acquisition unit 150c outputs the first shape information and the second shape information to the assessment unit 150d.

The assessment unit 150d is a processing unit that specifies, based on the first shape information and the second shape information, a moving subject (dynamic object) from among the subjects included in the captured image data and that conducts an assessment of the specified moving object. A process of specifying a moving subject and a process of conducting an assessment of the moving object performed by the assessment unit 150d will be described.

An example of a process in which the assessment unit 150d specifies a subject that is moving will be described. The assessment unit 150d specifies, based on the first shape information, the shape of the subject and the location of the subject included in the captured image data. For example, it is assumed that shape and the location of the subject specified based on the first shape information are the subjects 11a and 11b illustrated in FIG. 2. Furthermore, it is assumed that the shape and the location of the static object specified based on the second shape information is the static object 10a illustrated in FIG. 2.

The assessment unit 150d specifies, as the static object, from among the subjects included in the first shape information, the subject associated with the shape and the location of the static object that are included in the second shape information. The assessment unit 150d specifies, as a dynamic object, from among the subjects included in the first shape information, the subject that is not associated with the shape and the location of the static object that are included in the second shape information.

As described with reference to FIG. 2, because the location of the shape of the static object 10a is associated with the location of the shape of the subject 11a, the assessment unit 150d determines that the subject 11a is a static object. Because the static object associated with the location of the shape of the subject 11b is not present in the second shape information (the static object shape data 10), the assessment unit 150d determines that the subject 11b is a dynamic object.

Subsequently, an example of a process in which the assessment unit 150d conducts an assessment of the moving object 5 will be described. The assessment unit 150d compares time t included in the first shape information with the moving speed table 140b and acquires the information on the moving speed of the moving object 5 associated with time t. The assessment unit 150d sets, based on the moving speed, the "safety area" in which there is no possibility of a collision, the "caution area" in which there is a low possibility of a collision, and a "dangerous area" in which there is a high possibility of a collision.

For example, the assessment unit 150d calculates a distance D1 based on an expression indicated by moving speed×time T1 and sets, as the "safety area", a predetermined area located in front of the moving object 5 by the distance D1. The assessment unit 150d calculates a distance D2 based on the expression of moving speed×time T2 and sets, as the "caution area", a predetermined area located in front of the moving object 5 by the distance D2. The assessment unit 150d calculates a distance D3 based on the expression of moving speed×time T3 and sets, as the "dangerous area", a predetermined area located in front of the moving object 5 by the distance D3.

FIG. 7 is a diagram illustrating an example of each of the areas that are set in the assessment unit. In the example illustrated in FIG. 7, a safety area A1, a caution area A2, and a dangerous area A3 are illustrated. The magnitude relation among time T1, T2, and T3 is time T1>time T2>time T3 and it is assumed that each of the pieces of time T1 to T3 is previously set in accordance with a reaction rate of a driver.

The assessment unit 150d assesses the moving object by comparing the subject (dynamic object) specified as the moving object, the safety area, the caution area, and the dangerous area. The assessment unit 150d generates, based on the assessment result, information related to control of the moving object.

For example, if a dynamic object is included in the safety area A1, the assessment unit 150d allows the display unit 130 to display the shape and the location of the dynamic object. If the dynamic object is included in the caution area A2, the assessment unit 150d allows the display unit 130 to display the information in which the shape and the location of the dynamic object is highlighted. If the dynamic object is included in the dangerous area A3, the assessment unit 150d may also allow the display unit 130 to display a warning and output a control signal to the moving object 5 in order to allow the moving object 5 to reduce a moving speed. Whether or not to enable the control of the moving speed performed by the assessment unit 150d may also previously be set by a user.

In the following, an example of the flow of a process performed by the assessment device 100 according to the embodiment will be described. FIG. 8 is a flowchart illustrating the flow of a process performed by the assessment device according to the embodiment. As illustrated in FIG. 8, the receiving unit 150a in the assessment device 100 downloads the static object data 140c from the server 60 (Step S101).

The receiving unit 150a receives the captured image data from the stereo camera 100a (Step S102). The generating unit 150b in the assessment device 100 extracts the shape of the subject included in the captured image data and generates the first shape information (Step S103).

The acquisition unit 150c in the assessment device 100 acquires, from the static object data 140c, the second shape information that is associated with the image capturing location of the first shape information (Step S104). The assessment unit 150d in the assessment device 100 compares the shape and the location of the subject included in the first shape information with the shape and the location of the static object included in the second shape information and specifies the dynamic object (Step S105).

The assessment unit 150d sets, based on the moving speed of the moving object 5, the safety area, the caution area, and the dangerous area (Step S106). The assessment unit 150d compares each of the areas with the location (distance from the moving object 5) of the dynamic object and assesses the moving object (Step S107). The assessment unit 150d displays the assessment result on the display unit 130 (Step S108).

In the following, the effects of the assessment device 100 according to the embodiment will be described. The assessment device 100 compares the shape of each of the subjects extracted from the captured image data captured by the stereo camera 100a with the shape of the known static object that is associated with the location in which the captured image data has been captured, thereby specifying a moving object and conducting an assessment. Consequently, because the assessment device 100 can distinguish the static object from the dynamic object that are included in the captured image data captured by the stereo camera 100a and appropriately specify the objects, it is possible to improve each of the pieces of assessment accuracy of the objects.

The assessment device 100 generates information related to control of the moving object based on the assessment result. For example, the assessment device 100 compares the subject (dynamic object), the safety area, the caution area, and the dangerous area and performs control of the display of a warning and control of a moving speed of the moving object 5 in accordance with the state in which the moving object is included in which area. Consequently, it is possible to suppress a collision with a vehicle located ahead.

In the above explanation, regarding the assessment device 100, for the purpose of convenience, a description has been given of the configuration that uses the stereo camera 100a; however, it is also possible to alternatively use a configuration that uses the monocular camera (not shown). The monocular camera is a camera that captures an image by a single lens. If a moving object, such as a vehicle, is standing still, it is not possible to assesses the shape of the outline or the like of the static object or an immobile dynamic object by only using the monocular camera; however, it is possible to assess the outline of the object by using the monocular camera if the moving object starts moving.

In the following, a description will be given of an example of a hardware configuration of a computer that implements the same function as that performed by the assessment device 100 described above in the embodiment. FIG. 9 is a diagram illustrating an example of the hardware configuration of the computer that implements the same function as that performed by the assessment device.

As illustrated in FIG. 9, a computer 200 includes a CPU 201 that executes various kinds of arithmetic processing, an input device 202 that receives an input of data from a user, and a display 203. Furthermore, the computer 200 includes a reading device 204 that reads programs or the like from a storage medium and an interface device 205 that sends and receives data to and from the stereo camera 100a and the server 60 via a wired or wireless network. Furthermore, the computer 200 includes a RAM 206 that temporarily stores therein various kinds of information and a hard disk device 207.

The hard disk device 207 includes a reception program 207a, a generation program 207b, an acquisition program 207c, and an assessment program 207d. The CPU 201 reads each of the programs 207a to 207d and loads the programs 207a to 207d in the RAM 206.

The reception program 207a functions as a reception process 206a. The generation program 207b functions as a generation process 206b. The acquisition program 207c functions as an acquisition process 206c. The assessment program 207d functions as an assessment process 206d.

The process of the reception process 206a corresponds to the process performed by the receiving unit 150a. The process of the generation process 206b corresponds to the process performed by the generating unit 150b. The process of the acquisition process 206c corresponds to the process performed by the acquisition unit 150c. The process of the assessment process 206d corresponds to the process performed by the assessment unit 150d.

Furthermore, each of the programs 207a to 207d does not need to be stored in the hard disk device 207 in advance from the beginning. For example, each of the programs is stored in a "portable physical medium", such as a flexible disk (FD), a CD-ROM, a DVD disk, a magneto-optic disk, an IC card, that is to be inserted into the computer 200. Then, the computer 200 may also read each of the programs 207a to 207d from the portable physical medium and execute the programs.

It is possible to distinguish, in a moving object, static objects and dynamic objects and improve each of the pieces of assessment accuracy of the objects.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium having stored therein an assessment program that causes a computer to execute a process comprising:
   receiving a captured image captured by a stereo camera mounted on a moving object and an image capturing location of the captured image;
   generating, based on the received captured image, shape information on subjects included in the received captured image;
   calculating, based on the received captured image, a distance between each of the subjects included in the received captured image and the stereo camera;
   acquiring shape information on a static object associated with the received image capturing location from a storage that stores therein shape information on the static object included in the received captured image corresponding to the image capturing location of the received captured image;
   specifying, based on the generated shape information and the acquired shape information, a dynamic object that is moving from among the subjects included in the received captured image; and
   conducting an assessment related to the dynamic object based on the location of the specified dynamic object in the received captured image, the calculated distance between each of the subjects and the stereo camera, and a moving speed of the moving object.

2. The non-transitory computer readable recording medium according to claim 1, the process further comprising generating information related to control of the moving object based on a result of the assessment.

3. An assessment method comprising:
   receiving a captured image captured by a stereo camera mounted on a moving object and an image capturing location of the captured image, using a processor;
   generating, based on the received captured image, shape information on subjects included in the received captured image, using the processor;
   calculating, based on the received captured image, a distance between each of the subjects included in the received captured image and the stereo camera, using the processor;
   acquiring shape information on a static object associated with the received image capturing location from a storage that stores therein shape information on the static object included in the received captured image corresponding to the image capturing location of the received captured image, using the processor;
   specifying, based on the generated shape information and the acquired shape information, a dynamic object that is moving from among the subjects included in the received captured image, using the processor; and
   conducting an assessment related to the dynamic object based on the location of the specified dynamic object in the received captured image, the calculated distance between each of the subjects and the stereo camera, and a moving speed of the moving object, using the processor.

4. The assessment method according to claim 3, further comprising generating information related to control of the moving object based on a result of the assessment.

5. An assessment device comprising:
   a memory; and
   a processor that executes a process comprising:
   receiving a captured image captured by a stereo camera mounted on a moving object and an image capturing location of the captured image;
   calculating, based on the received captured image, a distance between each of the subjects included in the received captured image and the stereo camera;
   generating, based on the received captured image, shape information on subjects included in the captured image;
   acquiring shape information on a static object associated with the received image capturing location from the memory that stores therein shape information on the static object included in the received captured image corresponding to the image capturing location of the received captured image;

specifying, based on the generated shape information and the acquired shape information, a dynamic object that is moving from among the subjects included in the received captured image; and conducting an assessment related to the dynamic object based on the location of the specified dynamic object in the received captured image, the calculated distance between each of the subjects and the stereo camera, and a moving speed of the moving object.

6. The assessment device according to claim 5, the process further comprising generating information related to control of the moving object based on a result of the assessment.

* * * * *